United States Patent

[11] 3,617,383

| [72] | Inventors | Richard A. Thurston<br>Danville;<br>Richard E. McConiga, La Grange Park, both of Ill. |
|---|---|---|
| [21] | Appl. No. | 659,916 |
| [22] | Filed | Aug. 11, 1967 |
| [45] | Patented | Nov. 2, 1971 |
| [73] | Assignee | CPC International Inc.<br>New York, N.Y. |

[54] PROCESS FOR PREPARING GRANULAR COLD-WATER-SWELLING STARCHES AND THE STARCHES RESULTING THEREFROM
19 Claims, 1 Drawing Fig.

[52] U.S. Cl. ................................................. 127/71, 127/32
[51] Int. Cl. ..................................................... C13l 1/08
[50] Field of Search ........................................ 127/32, 33, 71; 260/412.4, 412.8

[56] References Cited
UNITED STATES PATENTS
| 2,280,723 | 4/1942 | Schoch | 127/71 |
|---|---|---|---|
| 2,587,650 | 3/1952 | Rist | 127/71 |
| 3,399,081 | 8/1968 | Bernetti | 127/71 |
| 2,386,509 | 10/1945 | Schoch | 127/32 |

OTHER REFERENCES
J. E. Hodge, J. Am. Chem. Soc. 73, 3312–3316 (1951).
T. J. Schoch, " Methods in Carbohydrate Chem.," IV, R. L. Whistler, Ed., 56–59, Academic Press, New York, 1964.

Primary Examiner—Morris O. Wolk
Assistant Examiner—Sidney Marantz
Attorneys—Frank E. Robbins, James L. Bailey, Janet E. Price and Martha A. Michaels ABSTRACT: Starches, the granules of which are substantially completely intact and which have lost from about 40 percent to 100 percent birefringence, which will rapidly hydrate in cold water to form smooth, viscous pastes, are prepared as follows. Nongelatinized starch is slurried with (1) a solvent for starch (preferably water), and (2) an organic liquid which is miscible with the solvent for starch (e.g., methanol); the slurry is continuously passed through a confined zone wherein it is subjected to gelatinizing conditions. The process conditions are so selected as to produce the desired end product.

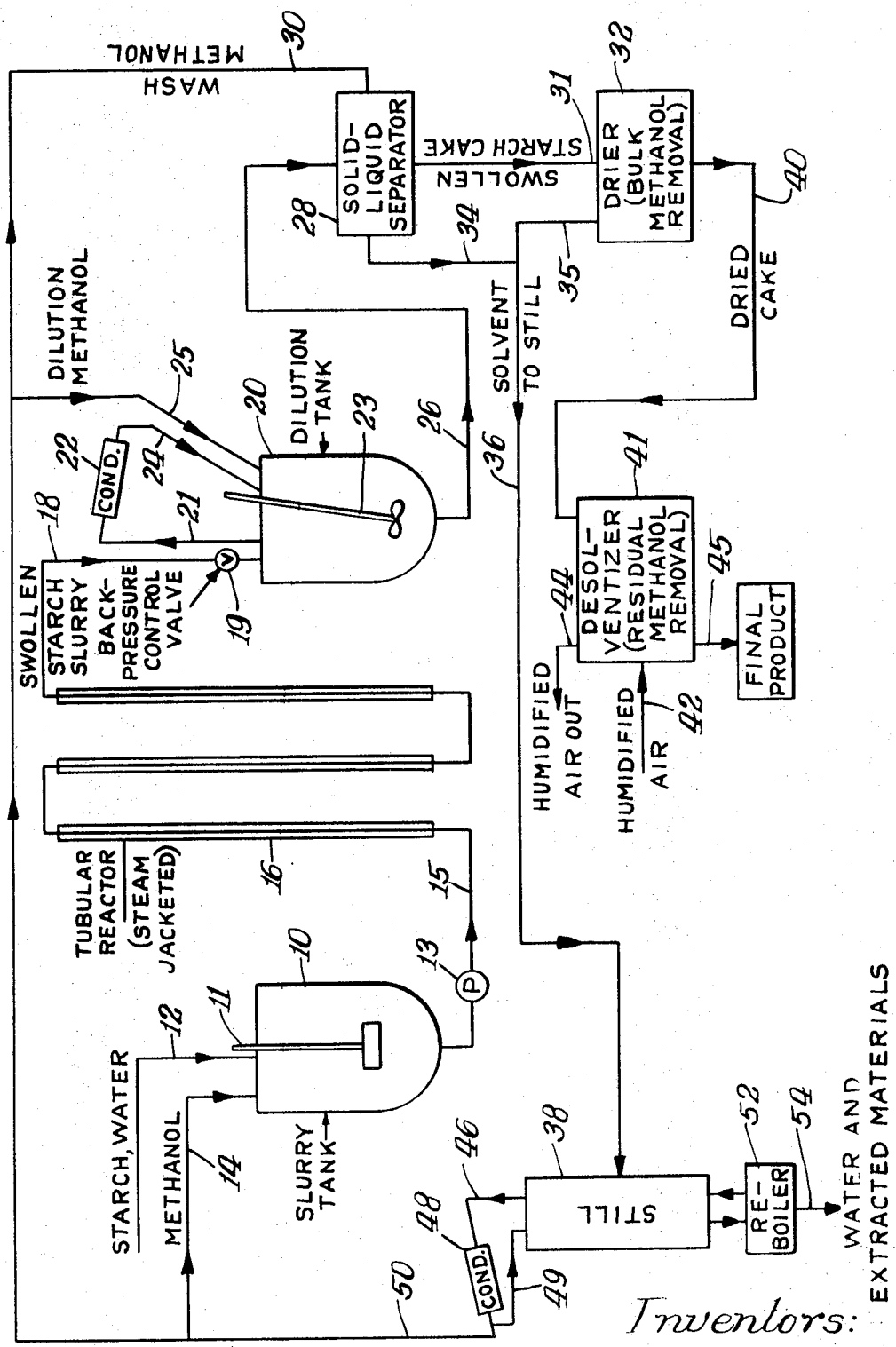

PROCESS FOR PREPARING GRANULAR COLD-WATER-SWELLING STARCHES AND THE STARCHES RESULTING THEREFROM

This invention relates to a method for preparing a cold-water-swelling starch, the granules of which are substantially completely intact, are slightly swollen, and which exhibit from about 40 percent up to 100 percent loss of birefringence when viewed under a polarizing microscope. By cold-water-swelling starch is meant a starch which, when added to cold water, will rapidly swell and disperse in the water to form a smooth, viscous paste.

It is known that when starch is gelatinized, during the preliminary stages of the process some of the bonds within the starch granules loosen (or weaken), the starch granules begin to take up solvent, they swell slightly, and they lose birefringence (i.e., the maltese crosses on the granules, which are apparent when viewed under a polarizing microscope, disappear). During this time the viscosity is gradually increasing. As the process continues, the granules continue to swell, starch substance begins to leak into the solvent, and the bonds continue to weaken; eventually the granules swell and the bonds weaken to the point that the starch goes completely into solution. Some of the granules fragmentize during the latter stages of the process; under certain conditions (e.g., the application of mechanical shear or extremely high temperature to a starch-water system) considerable fragmenting will occur. The viscosity increases as swelling increases, and decreases as fragmenting of the granules occurs.

Theoretically, at least, it should be possible to stop the gelatinization process at a point at which some or all birefringence has been lost, some of the bonds within the granules have been weakened, and some swelling of the granules has occurred, but before the maximum swelling and weakening of the bonds, with attendant complete solution, takes place. It should be possible to "catch" the gelatinization process at this point, instantly remove the solvent, and recover the resultant dry starch, the granules of which will have lost birefringence and will be slightly but not completely swollen. As a practical matter, however, stopping the gelatinization process at this point and recovering the starch having the specified characteristics would be extremely difficult even in the laboratory, and impossible in a commercial operation. The gelatinization process, of course, proceeds gradually rather than in separate and distinct steps; furthermore, the individual granules themselves do not undergo the process uniformly.

Present art knows so-called "cold-water-swelling starches" (also called "cold-water-dispersible" and "pregelatinized starches") in several forms. Ordinarily, an aqueous slurry or prepaste of starch is put over hot rolls and taken off as dry flakes. During this heating step, in which the granules may be largely gelatinized, solubles are also released. During drying, these act to cover and bind any intact granules into the drying film. Flakes of this film when added to cold water immediately take up water, adhere in clumps, residual granules are only slowly released and no smooth dispersion results. Ultimate viscosity is low due to the fraction of nonswelling solubles as well as to smaller fractions of retrograded starch and partially gelatinized granules. Furthermore, when the resultant paste is subjected to shear, the viscosity decreases. Other known means of pregelatinizing may involve spray drying, extrusion under heat developed with shear, or treatment with steam in humid beds. None of these methods takes starch to the point of partial granule swelling and loss of birefringence short of excessive granule breakdown and soluble substance release.

It is an object of the present invention to develop a simple, economical, and commercially feasible process for the preparation of cold-water-swelling starch.

A further object is to prepare starch which will readily disperse, or dissolve, in cold water to form a smooth, homogeneous, viscous paste, the viscosity of which increases, rather than decreases, when subjected to shear.

A more specific object is to prepare a granular, cold-water-swelling starch which is characterized by substantially no granular fragmentation, slight granule swelling, and up to 100 percent loss of birefringence.

Other objects and advantages will appear hereinafter.

The single FIGURE of drawing is a schematic diagram of apparatus that can be used for the practice of one preferred embodiment of a continuous process for treating starch material, in accordance with the present invention.

We have discovered a method whereby the process of gelatinization can be so controlled as to permit recovery of dry starch, the granules of which are intact, slightly swollen, and have lost up to 100 percent birefringence. The starch so recovered is truly "cold-water-swelling"; when added to cold water it rapidly forms a smooth, uniform, viscous paste. The process is simple, economical, and readily adaptable to large scale commercial operations.

Starches treated in accordance with the invention have a great many uses; for example, those exhibiting complete or nearly complete loss of birefringence are excellent thickening agents in foodstuffs, adhesives, etc. Starches exhibiting less than complete birefringence loss e.g. about 50 percent can be used to prepare enzyme-thinned starch (for paper coating, sizing, or the like) of exceptionally high solids content.

Briefly, the process is as follows. Ungelatinized starch (i.e. starch which is characterized by intact, unswollen granules which exhibit the typical maltese crosses under polarized light) is first slurried in a mixture of (1) a solvent for starch, and (2) an organic liquid which is itself not a solvent for starch and which is miscible with the solvent for starch. The slurry is passed through a suitable confined heat exchange zone, in which it is subjected to gelatinizing conditions. The specific conditions of time of treatment, temperature of treatment, and proportions of the ingredients in the slurry are so selected as to permit from about 40 percent up to 100 percent of the starch granules to lose birefringence. The proper selection of these conditions will be discussed fully hereinafter. By the term "solvent for starch" is meant any liquid in which starch will dissolve, or gelatinize. The most commonly used and most economical solvent for starch is, of course, water, and this is our preferred solvent. Other common solvents, however, such as dimethyl sulfoxide, dimethyl formamide, N-methyl pyrrolidone, or 2-amino ethanol, are just as suitable, albeit less economical, in the practice of the invention. In the following discussion this liquid will be referred to as the "solvent".

The second liquid component of the slurry can be any organic liquid which is miscible with the solvent for starch and which is not itself a solvent for starch. If the starch is to be used as an ingredient in food, then obviously substantially all of the organic liquid must be removed from the starch after treatment; for this reason it is desirable to use a liquid which is not excessively retained within the starch granules. It is also desirable, for economic reasons, to select a liquid which can be readily recovered from the solvent for reuse. Lower alcohols (e.g. methanol, ethanol, isopropanol, tertiary butanol), ketones (e.g. acetone, methyl ethyl ketone), dioxane, etc. are particularly suitable in the practice of the invention. In the following discussion, this component will be referred to as the "organic liquid.".

The invention can be performed using any amylose-containing starch, e.g. starch derived from corn, wheat, nonwaxy sorghum (also known as red milo), high-amylose corn, potato, tapioca, rice, etc., as well as chemically modified and/or derivatized starches. We have found that the fragile waxy starches (in underivatized form) e.g. waxy maize, waxy rice, and waxy sorghum (also known as white milo), with their high-swelling tender granules, are difficult to maintain in granule form during treatment; it seems reasonable to assume, however, that these waxy starches could be effectively treated in accordance with the invention by proper selection of conditions. Waxy starches which have been stabilized by a high degree of chemical cross-linking, on the other hand, are eminently suitable for treatment in accordance with the invention.

Modified starches (e.g. thin-boiling starches) and/or starch derivatives (e.g. cationic starches, anionic starches, starch phosphates, starch acetates, hydroxyethyl starch, and the like) can be readily processed in accordance with the invention, the only requirement being that the modified or derivatized starch be nongelatinized, i.e. granular and birefringent, prior to treatment. For convenience, all such granular starches, granular modified starches, and granular starch derivatives, that can be processed in accordance with the invention, are sometimes referred to hereafter as starch material, or as granular or ungelatinized starch material.

To practice the process of the invention, the slurry is passed through a confined zone, preferably a tubular heat exchanger, in which the slurry is subjected to gelatinizing conditions. By the term "gelatinizing conditions" is meant the type of conditions which would be necessary to gelatinize the starch material in the particular starch solvent being used. For example, if water is the solvent, heat must be applied; if the solvent is one which will gelatinize starch without the application of heat, e.g. an aqueous alkaline solution of sufficient concentration to gelatinize starch at room temperature, then the slurry is merely maintained for a time sufficient to achieve the desired degree of birefringence loss.

After the treatment the granular starch material is recovered from the liquid phase of the slurry, as by filtration, and dried. With most liquid systems it is desirable to add excess organic liquid to the slurry, thereby reducing the overall solvent content, prior to recovering the starch from the slurry. This step is particularly important when water is used as the solvent for the following reasons: (1) it greatly facilitates filtration of the starch material from the slurry, and (2) unless the water content is reduced, if the processed starch material is dried with the application of heat, an unacceptable "horny" product results, which will not readily dissolve in water.

The product, which swells and hydrates in water, obviously cannot be washed with water; it can, of course, be washed with the organic liquid. If the starch material is to be used in food products, and the organic liquid is inedible, then substantially all of the liquid must, of course, be removed from the treated starch material. Any process which will effectively remove the liquid without adversely affecting the starch material (such as fragmenting the granules, pasting the starch material, or the like) can be employed.

The essence of the invention is the discovery that, by gelatinizing a starch material in the previously described liquid medium (i.e., a solvent or swelling agent for the starch material plus an organic liquid which is not a solvent or swelling agent for the starch material and is miscible with the solvent for the starch material), the gelatinization process can be so controlled as to permit the preparation of a product the granules of which have lost up to 100 percent birefringence, are partially swollen, and exhibit substantially no fragmentation.

Products having these characteristics are truly "cold-water-swelling" and are far superior to the previously known so-called "cold-water-swelling" or "pregelatinized" starches in the following characteristics:
1. unlike the prior art products, they rapidly and completely hydrate in cold water to form smooth, uniform pastes without any formation of lumps;
2. the resultant pastes are more viscous than those obtained from the prior art products;
3. pastes formed from prior art products decrease in viscosity when subjected to shear, while those formed from the products of the invention increase in viscosity when subjected to shear;
4. the pastes are extremely bland in flavor, and do not have the "cereal taste" characteristic of the prior art products.

The proper treatment conditions are dependent upon the particular liquid phase being employed, the particular starch material being treated, and the amount of loss of birefringence desired in the end product. These conditions can readily be ascertained, and the following discussion and examples will guide persons skilled in the art in selecting the conditions necessary for any particular system and product. In the discussion and examples we shall set forth extensive data on our preferred system, i.e. corn starch, water and methanol, and we shall also set forth data on other systems. From these data, persons skilled in the art will readily be able to select optimum conditions for any desired system.

When water is used as the solvent for the starch material, heat, of course, is necessary for the gelatinization. When using methanol (which is preferred for reasons of economy) with water for the treatment of corn starch, the following conditions should be employed in order to obtain a product exhibiting 100 percent loss of birefringence: the liquid phase of the slurry should contain from 25 percent to 65 percent water and from 75 percent to 35 percent methanol (percentages by weight). The slurry should preferably contain (for practical reasons) from about 10 percent to about 40 percent starch (by weight, based on the weight of the total slurry). Although the process is operable if less than 10 percent starch is used, it is uneconomical. If much more than 40 percent starch is present, the slurry is difficult to handle. The time of treatment is extremely short, about 60 minutes being the maximum, and shorter times (e.g. about 2½ minutes or less) being preferred. The temperature of the treatment should be within the range of about 175° F. to about 350° F., and is dependent upon the ratio of methanol to water in the liquid phase, the higher the ratio the higher the temperature. To illustrate: if the liquid phase comprises 75 percent methanol and 25 percent water, the temperature should be near or at the upper limit of 350° F.; if the liquid phase comprises 35 percent methanol and 65 percent water, the temperature should be near or at the lower limit of 175° F.

We prefer to employ relatively high temperatures with attendant high ratios of organic liquid (e.g. methanol) to solvent (e.g. water), as these conditions (1). the maximum degree of control. (2), As has been stated previously, products having less than total (100 percent) loss of birefringence also have many uses. The conditions recited in the preceding paragraph will result in products having substantially no birefringence; by appropriate adjustment of the conditions, products having less loss of birefringence can be readily produced. For example, using a liquid phase having the maximum methanol/water ratio (i.e. 75 percent methanol/25 percent water) at a temperature of about 265° F. and a holding time of about 2 minutes will result in a granular, partially swollen starch exhibiting about 50 percent to 60 percent loss of birefringence.

The factor of time of treatment requires additional explanation. The reaction proceeds very rapidly to the point of complete loss of birefringence without granule damage depending upon the particular conditions used, this point can usually be reached in from about 40 seconds to about 3 minutes. Once this point is reached, the treatment can be continued for up to about 60 minutes without causing granule damage, although we prefer a maximum of about 15 minutes. Therefore, when preparing products having 100 percent loss of birefringence, there is no critical "upper limit" with respect to time, except within the specified limits of about 60 minutes and preferably 15 minutes.

On the other hand, when a product having less than 100 percent birefringence loss is desired, time of treatment is a critical factor. When preparing such products it is recommended that the temperature and liquid phase composition be so selected as to cause the reaction to proceed slowly, and then stop the reaction when the desired product is produced.

After the treatment has been completed, the slurry is preferably diluted with an additional quantity of methanol, allowed to cool, filtered, washed with more methanol, and dried.

The particular process conditions for other systems will depend upon the type of starch being processed, the solvent used and the organic liquid used. In the examples we shall set forth suitable conditions for various systems and persons skilled in the art will readily be able to determine, from these "-guidelines," suitable conditions for any other desired system.

The process of the invention can be performed in any apparatus which will permit good temperature control and which will maintain the liquid phase of the slurry in liquid form throughout the treatment. It can be performed, for example, in a continuous confined heat exchanger such as tubular heat exchanger, or in a confined, agitated heat exchanger, such as for example, a Votator heat exchanger, such as is commonly employed in food processing.

A preferred type of apparatus, which permits the process to be performed in a rapid, continuous and highly efficient manner, is a jacketed tubular reactor. The reactor comprises at least one tube that is equipped with an outer jacket through which a heating medium such as hot water, steam, or superheated steam, is passed. Instead of one tube, the reactor can comprise two or more jacketed tubes connected in series. The apparatus also includes means for controlling the residence time, temperature, and pressure of the slurry stream within the reactor, preferably together with means for terminating the treatment upon discharge of the slurry from the reactor. The treatment terminating means may comprise means for rapidly cooling the slurry stream upon discharge from the reactor. Preferably, the rapid cooling means comprises means for flash-evaporating at least a portion of the liquid from the slurry. According to another preferred embodiment of the invention, the means for rapidly cooling the slurry stream comprises means for diluting the slurry stream, upon discharge from the reactor, with an added quantity of the organic liquid. Alternatively, both flash-evaporation means and dilution means may be used.

Referring now in detail to the drawing by numerals of reference, the number 10 denotes a tank that is equipped with a mixer 11, for making up slurry. A supply line 12 is disposed to discharge a starch-water slurry into the tank 10. A supply line 14 is disposed to discharge methanol into the tank 10. Obviously, these supply lines can be used to feed other materials into the slurry tank, and specific materials are mentioned only to facilitate a description of one preferred embodiment of the process of the invention. Moreover, since the process is intended to be a continuous process, ordinarily a plurality of slurry tanks would be mounted in parallel, to permit alternate use and continuous discharge of slurry from at least one of the tanks, or alternatively, flow controllers could be installed on the lines 12 and 14 to permit continuous operation from a single tank.

The slurry tank 10 is connected to a pump 13, that discharges through a line 15 into one end of a steam jacketed tubular reactor 16. The internal diameter of the heat exchange tube is selected for efficient heat exchange, preferably under turbulent flow conditions. The velocity of the slurry must be sufficiently high to prevent settling. A velocity of one foot per second, or greater, is adequate for this purpose. This tubular reactor discharges through a line 18, that is provided with a control valve 19, into a receiving or dilution tank 20. The tank 20 is equipped with a mixer 23.

The tank 20 is also equipped with a superposed reflux condenser. This includes a vapor uptake line 21, and a condenser 22, and a liquid return line 24, that drains the condenser back into the tank 20. A methanol supply line 25 is disposed to feed methanol into the tank 20.

A discharge line 26 interconnects the lower end of the dilution tank 20 with a solid-liquid separator 28. This separator may be, for example, a filter, a centrifuge, or the like. In practice, several similar items of separating equipment might be mounted in parallel, to permit continuous operation. A methanol supply line 30 is connected to the separator 28, to permit washing the separated solid material with methanol, if desired.

From the separator 28, the solid cake is transferred, as is indicated in the drawing by the line 31, to a drier 32. Any suitable form of drying apparatus may be employed. The preferred ways of drying are by contact of the starch material with hot humid air or with live superheated steam, in a tray drier, or in a fluidized bed, or the like.

The liquid material from the filter or other separator 28 is withdrawn through a line 34. The methanol that is removed in the drier 32 is condensed and the condensate is passed through a line 35, into a line 36 that feeds a still 38.

The dried cake from the drier is transferred, as is indicated by the line 40 in the drawing, to a desolventizer 41, which removes residual traces of methanol from the dry cake. This can be accomplished in any desired manner, but preferably is accomplished by contacting the dried cake with live, superheated steam. Alternatively, hot humidified air can be used as shown in the drawing. The humidified air is supplied to the desolventizer through a line 42, and is discharged through a line 44. The solid product is removed from the desolventizer as final product, as indicated by the line 45 in the drawing.

The still 38 permits purification, recovery, and reuse of the organic liquid within the system, which for economic reasons is a closed system. A reflux condenser is disposed above the still, and includes a vapor line 46, a condenser 48, and a recycle return line 49. The condenser 48 is also connected to a manifold 50, that communicates with the methanol supply lines 14, 25 and 30 respectively, to supply fresh methanol to the several points in the process where it is used. A reboiler 52 is disposed beneath the still 38, and water and extracted materials are discharged from the reboiler 52 through a line 54.

The following examples will illustrate the practice of the invention. They are presented for illustrative purposes only, and should not be construed as limiting the invention in any way. In the examples all parts and percentages are by weight, unless stated otherwise.

EXAMPLE I

This example illustrates the process conditions for the treatment of corn starch with a water-methanol liquid system.

Regular, unmodified, corn starch was slurried with several different mixtures of water and methanol, after which the slurries were rapidly heated for between 1 and 2 minutes, during passage through the tubular heat exchanger. Upon discharge from the tubular reactor, additional methanol was added to the slurry, in an amount sufficient to bring the water content of the slurry to about 15 percent. The slurry was then permitted to cool in the dilution tank, after which it was filtered. The treated starch was washed with methanol and dried. The treatment conditions for the several runs are reported in table I. In each case, sufficient pressure was maintained on the slurry, within the tubular reactor, to maintain the liquid vehicle in the liquid phase.

Solutions of the processed starches, in cold water, were then prepared; in all cases the starches hydrated rapidly and completely in the water to form smooth, viscous pastes. These pastes were examined under a polarizing microscope; it was observed that all of the granules were intact, and were uniformly swollen. The loss of birefringence was determined by means of the microscopic examination; this is reported in table I.

Brookfield viscosities were determined in the following manner. A weighed amount of processed starch was added to a weighed amount of water and stirred for 2 minutes. The paste was allowed to stand for 2 hours after which an LVF Brookfield viscometer was used to measure the viscosity of the paste. The concentration of processed starch in water (weight percent) which yielded a 50 poise viscosity was recorded; these values are reported in table I.

TABLE I

| Sample No. | Composition of slurry (percent) | | | Temp. (° F.) | Loss of birefringence, percent | Brookfield viscosity (concentration of processed starch in water required to produce a paste of 50-poise viscosity) at— | |
|---|---|---|---|---|---|---|---|
| | Starch[1]/H₂O/ methanol | Liquid/ starch[1] | Liquid phase, H₂O/ methanol | | | 25° C. | 60° C. |
| 1 | 16.7/41.65/41.65 | 83.3/16.7 | 50/50 | 230 | 100 | 9.2 | 8.7 |
| 2 | 16.7/41.65/41.65 | 83.3/16.7 | 50/50 | 280 | 100 | 7.5 | 6.9 |
| 3 | 20/40/40 | 80/20 | 50/50 | 225 | 100 | 10.3 | 9.5 |
| 4 | 20/40/40 | 80/20 | 50/50 | 245 | 100 | 9.4 | 8.7 |
| 5 | 16.7/20.8/62.5 | 83.3/16.7 | 25/75 | 280 | 100 | 8.5 | 7.6 |
| 6 | 25/18.75/56.25 | 75/25 | 25/75 | 285 | 100 | 10.5 | 9.4 |
| 7 | 20/30/50 | 80/20 | 37.5/62.5 | 260 | 100 | 8.85 | 8.4 |
| 8 | 20/30/50 | 80/20 | 37.5/62.5 | 280 | 100 | 8.3 | 7.9 |
| 9 | 20/30/50 | 80/20 | 37.5/62.5 | 285 | 100 | 7.7 | 7.4 |
| 10 | 16.7/20.8/62.5 | 83.3/16.7 | 25/75 | 265 | 50–60 | 25 | |
| 11 | 20/24/56 | 80/20 | 30/70 | 340 | 100 | 6.9 | |

[1] Starch reported on dry substance basis.

As can be seen from the data in table I, the principal variables to be considered for a particular starch-solvent-organic liquid system are (1), the relative proportions of starch solvent and organic liquid in the liquid phase, and (2), the temperature of treatment. These variables are interdependent, the lower the ratio of starch solvent to organic liquid, the higher the temperature required to produce a specific product. This can be illustrated by comparing samples 5, 7, and 10. At a ratio of water to methanol of 25/75 (samples 5 and 10), a temperature of 265° F. resulted in only 50 percent to 60 percent loss of birefringence, while a temperature of 280° F. resulted in 100 percent loss. Run No. 7, with a water/methanol ratio of 37.5/62.5, resulted in complete loss of birefringence using a temperature of 260° F.

It will be noted, however, that the temperature and composition of the liquid phase can be adjusted within relatively wide ranges, without significant differences in the finished product; because of this the process of the invention is very flexible, easy to control, and therefore readily adaptable to large-scale operations.

This flexibility can be seen from a comparison of samples 7, 8, and 9, wherein the temperature was adjusted from 260° F., 280° F. and 285° F. (the composition of the slurry being constant) with no significant difference in the end products, and from a comparison of samples 5 and 8, wherein using ratios of water/methanol of 25/75 and 37.5/62.5, respectively (the temperature remaining constant) resulted in practically identical products. It will also be noted that the process is most flexible when relatively high temperatures (about 280° F. and higher) and attendant low ratios of solvent to organic liquid are employed; for this reason, these conditions are preferred.

A third, but relatively insignificant, variable is the ratio of liquid phase to starch. Differences in the liquid/solids ratio, within the practical range from 10 percent to 40 percent starch solids by weight, based on the weight of the total slurry, produce only slight variations in the end products, ad can generally be discounted.

EXAMPLE II

This example illustrates the practice of the invention on starches other than the regular, unmodified corn starch used in example I.

The following starches were treated in accordance with the procedure set forth in example I, using the tubular reactor: regular milo starch (also known as red milo or nonwaxy sorghum starch); a blend of highly cross-linked red milo and white milo (also known as waxy sorghum) starch; a highly cross-linked white milo starch, which had been derivatized to a Scott viscosity of 12 grams, 100 ml. flow, in 62–75 seconds; 20-fluidity corn starch; 40-fluidity corn starch; and a red milo starch phosphate.

TABLE II

| Sample No. | Starch description | Composition of slurry (percent) | | | Temp. (° F.) | Loss of birefringence, percent | Brookfield Viscosity (Concn. of processed starch in water required to produce a paste of 50-poise viscosity) at— | |
|---|---|---|---|---|---|---|---|---|
| | | Starch[1]/H₂O/ methanol | Liquid/ starch | Liquid phase, H₂O/ methanol | | | 25° C. | 60° C |
| 12 | Regular (red) milo | 20/30/50 | 80/20 | 37.5/62.5 | 250 | 100 | 9.6 | 8.8 |
| 13 | do | 20/30/50 | 80/20 | 37.5/62.5 | 270–275 | 100 | 7.75 | 7.4 |
| 14 | do | 20/30/50 | 80/20 | 37.5/62.5 | 260–270 | 100 | 8.0 | 7.6 |
| 15 | Blend of cross-linked red and white milo | 20/30/50 | 80/20 | 37.5/62.5 | 250 | 100 | 9.9 | |
| 16 | do | 20/30/50 | 80/20 | 37.5/62.5 | 245–250 | 100 | 10.6 | 10.15 |
| 17 | Cross-linked white milo | 20/24/56 | 80/20 | 30/70 | 270 | 97–98 | | |
| 18 | do | 20/24/56 | 80/20 | 30/70 | 278 | 100 | 7.25 | 7.25 |
| 19 | 20-fluidity corn starch | 20/30/50 | 80/20 | 37.5/62.5 | 280–285 | 100 | 9.3 | |
| 20 | 20-fluidity corn starch | 20/30/50 | 80/20 | 37.5/62.5 | 280–285 | 100 | 9.2 | |
| 21 | 40-fluidity corn starch | 20/30/50 | 80/20 | 37.5/62.5 | 275–280 | 100 | 10.9 | |
| 22 | do | 20/30/50 | 80/20 | 37.5/62.5 | 275–280 | 100 | 11.15 | |
| 23 | Milo starch phosphate | 20/30/50 | 80/20 | 37.5/62.5 | 250–255 | 100 | 5.2 | |

[1] Starch reported on dry substance basis.

The specific treatment conditions, and the properties of the resultant starches, are given in table II. All of the processed starches rapidly dissolved in cold water to form smooth, viscous pastes.

In addition to the runs reported in table II a number of corn starch derivatives, i.e. nongelatinized starch acetate, hydroxyethyl starch and a nitrogen-containing cationic corn starch derivative prepared by etherifying corn starch with the reaction product of epichlorohydrin and trimethylamine. The slurries comprised one part of starch to four parts of liquid; the liquid phase comprised 37.5 percent water and 62.5 percent methanol. Treatment temperature was about 275° F. In all cases the recovered, processed starch derivatives rapidly dispersed in cold water to form smooth, viscous pastes.

EXAMPLE III

In this example unmodified corn starch was treated in accordance with the process of this invention, following generally the previous procedure, and using water as the solvent for starch and liquids other than methanol as the organic liquids. Four runs were made, using a starch/liquid phase ratio of one fourth in all cases.

The treatment conditions are given in table III.

TABLE III

| Sample No.: | Organic liquid used | $H_2O$/ organic liquid ratio | Treatment temp. (° F.) |
|---|---|---|---|
| 24 | Ethanol | 55/45 | 181 |
| 25 | Isopropanol | 65/35 | 181 |
| 26 | n-Propanol | 65/35 | 181 |
| 27 | Acetone | 80/20 | 163 |

All of the products dissolved rapidly in cold water to give smooth, viscous pastes. Examination under the polarizing microscope showed swollen but fully intact granules with complete loss of birefringence

EXAMPLE IV

This example illustrates the use of a solvent for starch other than water.

A slurry was prepared comprising one part (by weight) of ungelatinized corn starch to four parts of liquid. The liquid component comprises 50 percent dimethyl sulfoxide and 50 percent methanol.

The slurry was continuously passed through a Votator, at a temperature of about 240° F. The residence time in the Votator was about 2 minutes.

The product hydrated rapidly in cold water to form a smooth, viscous paste. The granules showed 100 percent loss of birefringence when viewed under a polarizing microscope.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A continuous process for preparing a granular cold-water-swelling starch material, the granules of which are substantially completely intact, are not completely swollen, and exhibit from about 40 percent to about 100 percent loss of birefringence when viewed under a polarizing microscope, comprising:
    A. passing through a confined zone a stream of a slurry of
        1. a granular, ungelatinized starch material,
        2. a solvent for the starch material, said solvent being a member selected from the group consisting of water, dimethyl sulfoxide, dimethyl formamide, N-methyl pyrrolidone, and 2-amino ethanol, and
        3. an organic liquid which is miscible with the solvent for the starch material and which is not a solvent for the starch material, said organic liquid being a member selected from the group consisting of lower alcohols, lower ketones, dioxane, and mixtures thereof.
    B. subjecting the slurry in said zone to gelatinizing conditions for a period of time not greater than about 60 minutes, while maintaining sufficient pressure in said zone to maintain the liquid portion of the slurry in liquid form, and
    C. recovering the processed granular starch material from the slurry the conditions of time, temperature, and pressure in the zone, and the proportions of the components in the slurry, being so selected as to cause from about 40 percent to about 100 percent of the granules of the starch material to lose birefringence without any substantial fragmentation or complete swelling of the granules taking place.

2. The process of claim 1 wherein the organic liquid is methanol.

3. The process of claim 1 wherein the slurry is subjected to gelatinizing conditions for a period of time not greater than about 15 minutes.

4. The process of claim 1 including the additional step of adding an additional quantity of the organic liquid to the slurry after the slurry has material, subjected to the gelatinizing conditions.

5. The process of claim 1 wherein the slurry contains from about 10 percent to about 40 percent of the starch material by weight, based on the total weight of the slurry.

6. The process of claim 1 wherein the solvent for the starch material is water.

7. The process of claim 6 including the additional step of adding an additional quantity of the organic liquid to the slurry after the slurry has been subjected to the gelatinizing conditions.

8. The process of claim 1 wherein the starch material is a member selected from the group consisting of amylose-containing cereal starches and highly cross-linked waxy starches.

9. The process of claim 8 wherein the starch material is corn starch.

10. A continuous process for preparing a cold-water-swelling starch, the granules of which are slightly swollen, substantially completely intact, and exhibit from about 40 percent to about 100 percent loss of birefringence when viewed under a polarizing microscope, comprising:
    A. passing through a confined heat exchange zone a stream of a slurry of:
        1. a granular, ungelatinized starch material,
        2. water, and
        3. an organic water-miscible liquid, which is not a solvent for starch, and which is a member of the group consisting of lower alcohols, lower ketones, dioxane, and mixtures thereof,
    B. heating the slurry within the zone to at least gelatinizing temperature, while maintaining sufficient pressure within the zone to keep the liquid portion of the slurry in the liquid state, for a period of time not in excess of about 60 minutes, the conditions of temperature, time and pressure within the zone, and the relative proportions of the components in the slurry, being so selected as to cause from about 40 percent to about 100 percent of the granules of the starch material to lose birefringence without any substantial fragmentation or complete swelling of the granules taking place,
    C. then discharging the slurry from the confined heat exchange zone and rapidly cooling the slurry,
    D. recovering the processed starch material from the slurry, and
    E. drying the granular starch product.

11. The process of claim 10 wherein the granular, ungelatinized starch material is a member selected from the group consisting of amylose-containing cereal starches, highly cross-linked waxy starches, modified amylose-containing cereal starches, and derivatives of amylose-containing cereal starches.

12. The process of claim 10 wherein the slurry is rapidly cooled by flash evaporating at least a part of the organic liquid upon discharge from the heat exchange zone.

13. The process of claim 16 wherein the slurry is rapidly cooled by flash evaporating at least a part of the organic liquid and diluting the slurry with an additional quantity of fresh organic liquid upon discharge from the heat exchange zone.

14. The process of claim 10 wherein the slurry is rapidly cooled by diluting said slurry with an additional quantity of fresh organic liquid upon discharge from the heat exchange zone.

15. The process of claim 14 wherein sufficient additional organic liquid is added to reduce the water content of the slurry to not more than 15 percent by weight, based on the total weight of the slurry.

16. The process of claim 10 wherein the organic liquid is methanol.

17. The process f claim 16 wherein the slurry consists essentially of from about 10 percent to about 40 percent, by weight, of granular ungelatinized starch material and from about 90 percent to about 60 percent, by weight; of a liquid phase, based on the weight of the total slurry; and wherein said liquid phase consists essentially of from about 25 percent to about 65 percent, by weight, of water, and from about 75 percent to about 35 percent, by weight, of methanol, based on the weight of the total liquid phase.

18. The process of claim 17, wherein the slurry is heated, within the zone, at a temperature within the range of from about 175° F. to about 350° F. for not more than about 15 minutes.

19. The process of claim 18 wherein the starch material is corn starch.

* * * * *